(12) United States Patent
Pei

(10) Patent No.: US 9,525,459 B2
(45) Date of Patent: Dec. 20, 2016

(54) METHOD, RELATED DEVICE, AND SYSTEM FOR CROSSTALK CANCELLATION PROCESSING ON PORT LINE OF ACCESS DEVICE

(71) Applicant: Huawei Technologies Co., Ltd., Shenzhen (CN)

(72) Inventor: Daoyu Pei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 14/446,972

(22) Filed: Jul. 30, 2014

(65) Prior Publication Data

US 2014/0341372 A1    Nov. 20, 2014

Related U.S. Application Data

(63) Continuation of application No. PCT/CN2012/070875, filed on Feb. 3, 2012.

(51) Int. Cl.
*H04B 3/32* (2006.01)

(52) U.S. Cl.
CPC ........................... *H04B 3/32* (2013.01)

(58) Field of Classification Search
None
See application file for complete search history.

(56) References Cited

U.S. PATENT DOCUMENTS

| 5,991,311 | A | 11/1999 | Long et al. |
| 2002/0024261 | A1 | 2/2002 | Covaro et al. |
| 2006/0039456 | A1 | 2/2006 | Bostoen et al. |
| 2009/0175156 | A1* | 7/2009 | Xu ........................... H04B 3/32 370/201 |
| 2011/0080938 | A1* | 4/2011 | Fisher ...................... H04B 3/32 375/222 |
| 2011/0110409 | A1* | 5/2011 | Sands ..................... H04B 3/487 375/222 |
| 2011/0142111 | A1* | 6/2011 | Sands .................. H04M 11/062 375/222 |
| 2012/0020418 | A1 | 1/2012 | Sands et al. |

(Continued)

FOREIGN PATENT DOCUMENTS

| CN | 1741406 A | 3/2006 |
| CN | 101170321 A | 4/2008 |

(Continued)

*Primary Examiner* — Duc Duong
(74) *Attorney, Agent, or Firm* — Slater Matsil, LLP

(57) ABSTRACT

Embodiments of the present invention disclose a method and a related device and system for crosstalk cancellation processing on a port line of an access device. The method for crosstalk cancellation processing on a port line of an access device includes: obtaining line configuration information of another access device connected to—a first access device, and line group identities of different port lines belonging to a same cable bundle are the same; respectively obtaining, by the first access device, according to the line configuration information of the another access device, a coefficient of an effect from a port line of the another access device having a same line group identifier as that of a local port line on the local port line; and performing crosstalk cancellation processing on the local port line on the basis of the obtained effect coefficient.

18 Claims, 4 Drawing Sheets

(56) References Cited

U.S. PATENT DOCUMENTS

| | | | | |
|---|---|---|---|---|
| 2013/0051488 A1* | 2/2013 | Shridhar | ............... | H04B 3/32 375/285 |
| 2013/0235915 A1* | 9/2013 | Wang | ............... | H04M 11/062 375/222 |
| 2014/0133534 A1* | 5/2014 | Shi | ............... | H04M 3/34 375/222 |
| 2014/0140187 A1* | 5/2014 | Wang | ............... | H04M 11/062 370/201 |
| 2014/0219074 A1* | 8/2014 | Lu | ............... | H04B 3/32 370/201 |

FOREIGN PATENT DOCUMENTS

| | | |
|---|---|---|
| CN | 101741425 A | 6/2010 |
| EP | 2048794 A1 | 4/2009 |

* cited by examiner

US 9,525,459 B2

METHOD, RELATED DEVICE, AND SYSTEM FOR CROSSTALK CANCELLATION PROCESSING ON PORT LINE OF ACCESS DEVICE

This application is a continuation of International Application No. PCT/CN2012/070875, filed on Feb. 3, 2012, which is hereby incorporated by reference in its entirety.

TECHNICAL FIELD

The present invention relates to the field of communications, and in particular, to a method and a related device and system for crosstalk cancellation processing on a port line of an access device.

BACKGROUND

Line noises in a very high speed digital subscriber line 2 (VDSL2) mainly include crosstalk, an impulse noise, a radio-frequency noise and the like. Simply speaking, crosstalk is an effect from a signal in a twisted pair on a signal in another twisted pair as a result of electromagnetic interference among wire pairs because twisted pairs used in the VDSL2 are unshielded from each other. It is generally considered that crosstalk exists among wire pairs in a same cable bundle, and one twisted pair is subject to interference from multiple wire pairs. Because a relatively high frequency band (which may be up to 30 MHz) is used in a VDSL2 technology, external interference caused during sending through multiple wire pairs mainly comes from interference between neighboring wire pairs, which greatly reduces a sending rate of multiple wire pairs in a VDSL2 system.

In a vector technology, through a vectored VDSL2 system, joint processing (for example, coordinated sending) is performed on a signal in a downlink direction, or joint processing (for example, coordinated receiving) is performed on a signal in an uplink direction, so as to eliminate far-end self-crosstalk (that is, far-end crosstalk generated among lines in a vectored group), thereby enhancing performance.

FIG. 1 is a schematic structural diagram of an existing board-level vectoring processing system. An access device accesses a network system, and a line card (that is, a board) of the access device completes, through a built-in vectoring control entity (VCE), coordinated processing of uplink/downlink sending and receiving on port lines of the board, computes crosstalk effects among the port lines, and performs cancellation on far-end crosstalk among the port lines, so as to eliminate effects of crosstalk on signal sending and receiving on the port lines. However, this solution is only applicable to a scenario in which subscribers on a same cable bundle are all connected to a same line card, so the access device is accessible to a few subscribers, which poses a great limitation.

FIG. 2 is a schematic structural diagram of an existing system-level vectoring processing system. An access device is configured with an independent vectoring processor (VP) as a centralized vectoring processing board, and line cards D1-Dn of the access device are respectively connected to the centralized vectoring processing board through different ports. The centralized vectoring processing board completes coordinated processing of uplink/downlink sending and receiving on all port lines of the access device, computes crosstalk effects among the port lines, and performs cancellation on far-end crosstalk among the port lines, so as to eliminate effects of crosstalk on signal sending and receiving on the port lines. Compared with the solution shown in FIG. 1, in this solution, the number of subscribers that can access the access device is increased. However, this solution requires that subscribers on a same cable bundle access a same access device, so when subscribers on a same cable bundle are connected to different access devices, this solution cannot satisfy a requirement of the scenario.

SUMMARY

Embodiments of the present invention provide a method and a related device and system for crosstalk cancellation processing on a port line of an access device, which are used to satisfy a scenario in which subscribers on a same cable bundle are connected to different access devices.

In order to solve the foregoing technical problems, the embodiments of the present invention provide the following technical solutions:

A method for crosstalk cancellation processing on a port line of an access device is provided, where at least two interconnected access devices are included, and the method includes:
   obtaining, by a first access device of the at least two interconnected access devices, line configuration information of another access device connected to the first access device, where the line configuration information includes a line operation parameter and a line group identifier of at least one port line, and line group identities of different port lines belonging to a same cable bundle are the same;
   respectively obtaining, by the first access device, according to the line configuration information of the another access device, a coefficient of an effect from a port line of the another access device having a same line group identifier as that of a local port line on the local port line; and
   performing crosstalk cancellation processing on the local port line on the basis of the obtained effect coefficient.

An access device is provided and includes:
   a first obtaining unit, configured to obtain line configuration information of another access device connected to the access device, where the line configuration information includes line operation parameters and a line group identifier of at least one port line, and line group identities of different port lines belonging to a same cable bundle are the same;
   a second obtaining unit, configured to respectively obtain, according to the line configuration information of the another access device, a coefficient of an effect from a port line of the another access device having a same line group identifier as that of a local port line on the local port line; and
   a crosstalk cancellation processing unit, configured to perform crosstalk cancellation processing on the local port line on the basis of the effect coefficient obtained by the second obtaining unit.

A system for crosstalk cancellation is provided and includes:
   at least two interconnected access devices, where
   a first access device of the at least two interconnected access devices is configured to: obtain line configuration information of another access device connected to the first access device, where the line configuration information includes line operation parameters and a line group identifier of at least one port line, and line group identities of different port lines belonging to a same cable bundle are the same; respectively obtain, according to the line configuration information of the another access device, a coefficient of an effect from a port line of the another access device having a same line group identifier as that of a local port line on the local port line; and perform crosstalk cancellation processing on the local port line on the basis of the obtained effect coefficient.

It can be seen from the foregoing that, in the embodiments of the present invention, different port lines belonging to a same cable bundle are configured with a same line group identifier, and an access device obtains line configuration information of another access device connected to the access device, and implements, according to the line configuration information, cancellation of crosstalk among lines having the same line group identifier. In the solutions of the present invention, different wire pairs in a same cable bundle may be connected to ports of different access devices, which can satisfy a scenario in which subscribers on a same cable bundle are connected to different access devices.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Embodiments of the present invention provide a method and a related device and system for crosstalk cancellation processing on a port line of an access device.

To make the objectives, features, and advantages of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, on the basis of a system-level vectoring technology, access devices at a same network position are interconnected through cables, and cable vectoring processing across access devices is completed through coordinated cooperation among the devices, so that it is applicable to a scenario in which subscribers on a same cable bundle are connected to different access devices.

Figure 1:
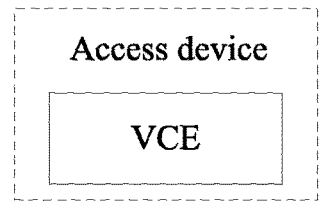
FIG. 1 is a schematic structural diagram of an existing board-level vectoring processing system.
Figure 2:
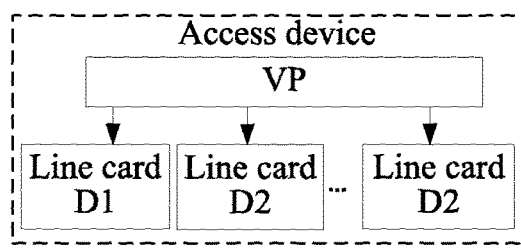
FIG. 2 is a schematic structural diagram of an existing system-level vectoring processing system.
Figure 3:
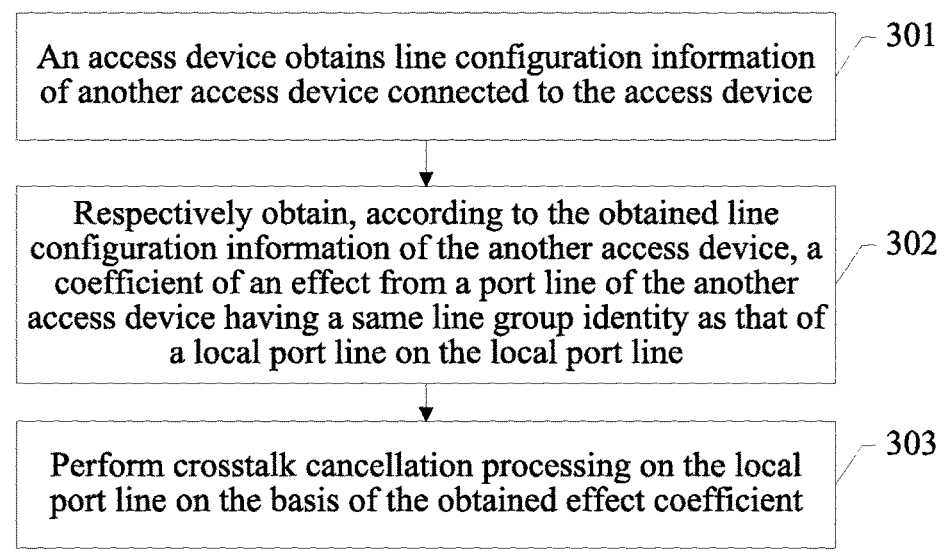
FIG. 3 is a schematic flow chart of an embodiment of a method for crosstalk cancellation processing on a port line of an access device according to the present invention.

The following describes a method for crosstalk cancellation processing on a port line of an access device according to an embodiment of the present invention. Referring to FIG. 3, the method includes:

301. An access device obtains line configuration information of another access device connected to the access device.

In the embodiment of the present invention, a port line of an access device is configured with a line group identifier, and port lines belonging to a same cable bundle are configured with a same line group identifier.

The access device obtains the line configuration information of the another access device connected to the access device, where the line configuration information includes line operation parameters (such as bit allocation, gain, frequency domain response, and error sample on each subcarrier) and a line group identifier of at least one port line.

For example, assume that a first access device, a second access device, and a third access device are interconnected through cables in the embodiment of the present invention; the first access device includes a port A and a port B, and port lines of the port A and the port B are respectively identified by line group identities S1 and S2; the second access device includes a port C and a port D, and port lines of the port C and the port D are respectively identified by line group identities S1 and S3; the third access device includes a port E and a port F, and port lines of the port E and the port F are respectively identified by line group identities S1 and S2. Using the first access device as an example, the first access device obtains line configuration information of the second access device and the third access device which are connected to the first access device. The line configuration information of the second access device includes line operation parameters and a line group identifier of at least one port line of the port C and the port D, and the line configuration information of the third access device includes line operation parameters and a line group identifier of at least one port line of the port E and the port F.

302. Respectively obtain, according to the obtained line configuration information of the another access device, a coefficient of an effect from a port line of the another access device having a same line group identifier as that of a local port line on the local port line.

In the embodiment of the present invention, the access device may learn, according to the obtained line configuration information of the another access device, which port lines of the another access device belong to a same cable bundle (that is, in a same group) as the local port line, and learn line operation parameters of a port line of the another access device belonging to the same cable bundle as the local port line; further, the access device respectively obtains a coefficient of an effect from the port line of the another access device having the same line group identifier as that of the local port line on the local port line.

The example in step 301 is used herein again for description. Assume that in step 301, the line configuration information of the second access device obtained by the first access device includes line operation parameters and line group identities of port lines of the port C and the port D, and the line configuration information of the second access device obtained by the first access device includes line operation parameters and line group identities of port lines of the port E and the port F, so the first access device may learn, according to the obtained line configuration information of the second access device and the third access device, that the port lines of the port C of the second access device and the port E of the third access device belong to a same cable bundle as the port line of the port A, and the port line of the port F of the third access device belongs to a same cable bundle as the port line of the port B. Therefore, by using a certain algorithm, the access device performs a matrix operation according to the obtained line operation parameters of the port C and line operation parameters of the port E, and performs a matrix operation according to the obtained line operation parameters of the port F, so as to respectively obtain coefficients of effects from the port lines of the port C and the port E on the port line of the port A, and a coefficient of an effect from the port line of the port F on the port line of the port B.

303. Perform crosstalk cancellation processing on the local port line on the basis of the obtained effect coefficient.

After obtaining the coefficient of the effect from the port line of the another access device in the same group on the local port line, the access device performs crosstalk cancellation processing on the local port line on the basis of the obtained effect coefficient, so as to eliminate a crosstalk effect from the port line of the another access device in the same group on the local port line.

Because multiple access devices are generally configured at a same network position, in practical application, multiple interconnected access devices exchange local line configuration information with each other. That is, in the embodiment of the present invention, an access device further sends local line configuration information to another access device connected to the access device, so that the another access device performs a crosstalk cancellation processing procedure.

In an application scenario, a main control access device is determined from multiple access devices, and the main control access device coordinates a crosstalk cancellation processing procedure of all the interconnected access devices at the network position in a unified manner. In the embodiment of the present invention, a standard for determining the main control access device from the multiple interconnected access devices may be defined. For instance, it may be defined that an access device having a maximum or minimum medium access control (MAC) address serves as the main control access device, or an access device having a maximum or minimum number of ports which are currently in a working state serves as the main control access device, or an access device having earliest or latest start time serves as the main control access device, or other device related information may be used as a standard for determining the main control access device, for example, the access devices each generate a random number, and the access devices determine, by exchanging their respective generated random numbers with each other and comparing the random numbers, which access device serves as the main control access device; the present invention is not limited herein. The main control access device may be determined by one access device, and the access device may determine the main control access device by obtaining device related information of another access device for determining the main control access device, according to a preset rule and with reference to local device related information; further, the access device may further inform the another access device of device information of the determined main control access device, so that the another access device knows the determined main control access device. Alternatively, the main control access device may be respectively determined by multiple access devices. The multiple access devices exchange their respective device related information with each other, and determine the main control access device according to a preset rule and with reference to their respective local device related information; the present invention is not limited herein. Further, when the main control access device determined according to the preset rule fails, a new main control access device may be determined, according to the preset rule, from an access device which does not fail. For example, if a main control access device is determined according to a rule that the access device has a maximum MAC address, when the main control access device fails, an access device having a second maximum MAC address is automatically determined as a new main control access device.

In the embodiment of the present invention, due to a limitation of a hardware resource, for a certain port line of the access device, effects from all other port lines in the same group may not be completely eliminated. Therefore, when the number of the effect coefficients obtained in step 302 exceeds a maximum resource cancellation number supported by the local port line, the effect coefficients are sorted in descending order according to effect degrees of the effect coefficients on the local port line, and crosstalk cancellation processing is performed on the local port line on the basis of a preset number of first effect coefficients after the sorting, where the preset number is smaller than or equal to the maximum resource cancellation number supported by the local port. For example, assume that there are altogether 128 other port lines in the same group, and the maximum resource cancellation number of the local port line is 48, so the obtained effect coefficients are sorted in descending order according to effect degrees of the other port lines in the group on the local port line. If the maximum resource cancellation number of the local port line is determined as the preset number, the crosstalk cancellation processing is performed on the local port line on the basis of the first 48 effect coefficients of the port lines after the sorting.

In the embodiment of the present invention, when the another access device interconnected to the access device fails, the access device enters a system-level vectoring working mode, that is, the access device performs coordinated processing of uplink/downlink sending and receiving on the local port lines, computes crosstalk effects among local port lines, and performs cancellation on far-end crosstalk among the local port lines.

It can be seen from the foregoing that, in the embodiment of the present invention, different port lines belonging to a same cable bundle are configured with a same line group identifier, and an access device obtains line configuration information of another access device connected to the access device, and implements, according to the line configuration information, cancellation of crosstalk among lines having the same line group identifier. In the solution of the present invention, different wire pairs in a same cable bundle may be connected to ports of different access devices, which can satisfy a scenario in which subscribers on a same cable bundle are connected to different access devices.

Figure 4:
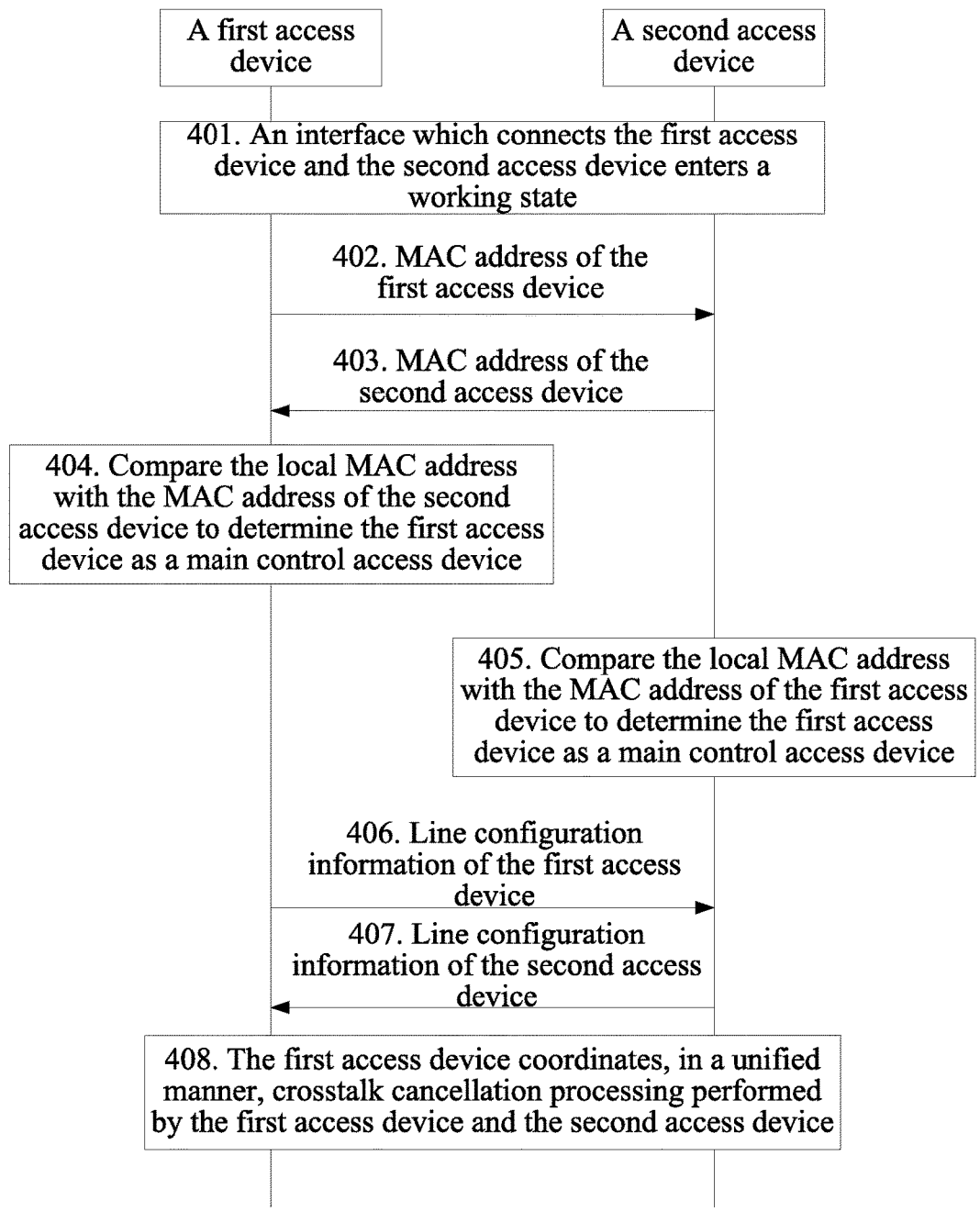
FIG. 4 is a schematic flow chart of an application scenario of a method for crosstalk cancellation processing on a port line of an access device according to the present invention.

The following describes a method for crosstalk cancellation processing on a port line of an access device according to an embodiment of the present invention by using a specific application scenario. In the embodiment of the present invention, a first access device and a second access device are interconnected through cables, and it is defined that an access device having a maximum MAC address serves as a main control access device. Referring to FIG. 4, the method includes:

401. An interface which connects the first access device and the second access device enters a working state.

When the interface which connects the first access device and the second access device enters a working state (that is, the interface is in an UP state), the first access device and the second access device can perform data transmission through the interface.

402. The first access device transmits a MAC address of the first access device to the second access device through the interface.

403. The second access device transmits a MAC address of the second access device to the first access device through the interface.

404. The first access device compares the local MAC address with the MAC address of the second access device to determine the first access device as a main control access device (assume that in the embodiment of the present invention, the MAC address of the first access device is greater than the MAC address of the second access device).

405. The second access device compares the local MAC address with the MAC address of the first access device to determine the first access device as a main control access device (assume that in the embodiment of the present invention, the MAC address of the first access device is greater than the MAC address of the second access device).

406. The first access device sends local line configuration information of the first access device to the second access device.

407. The second access device sends local line configuration information of the second access device to the first access device.

408. The first access device coordinates, in a unified manner, crosstalk cancellation processing performed by the first access device and the second access device.

After step 407, the first access device serving as the main control access device coordinates, in a unified manner, crosstalk cancellation processing performed by the first access device and the second access device, so that the first access device completes crosstalk cancellation processing of a local port line, and the second access device completes crosstalk cancellation processing of a local port line.

It can be seen from the foregoing that, in the embodiment of the present invention, different port lines belonging to a same cable bundle are configured with a same line group identifier, and an access device obtains line configuration information of another access device connected to the access device, and implements, according to the line configuration information, cancellation of crosstalk among lines having the same line group identifier. In the solution of the present invention, different wire pairs in a same cable bundle may be connected to ports of different access devices, which can satisfy a scenario in which subscribers on a same cable bundle are connected to different access devices.

Figure 5:
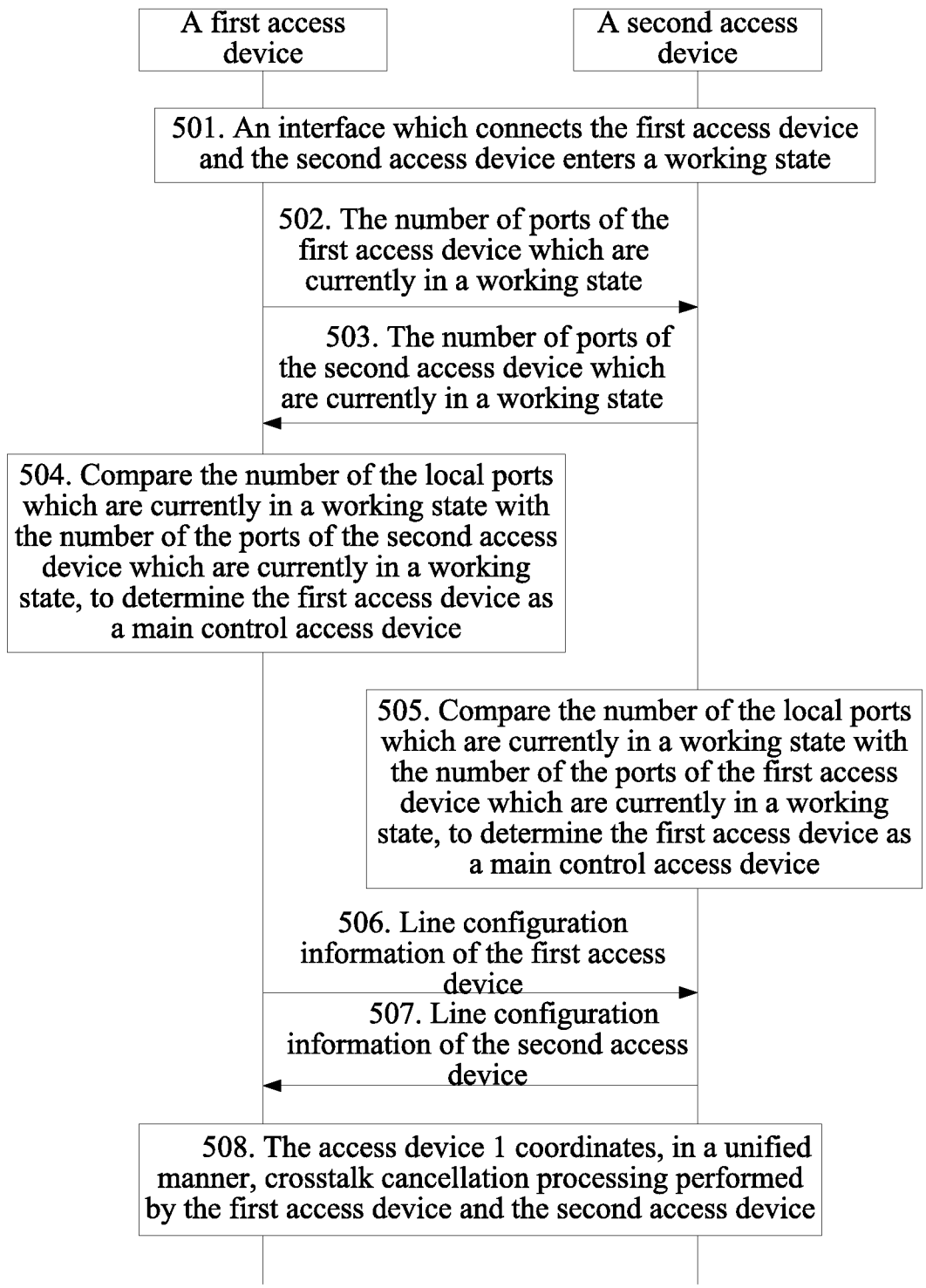
FIG. 5 is a schematic flow chart of another application scenario of a method for crosstalk cancellation processing on a port line of an access device according to the present invention.

The following describes a method for crosstalk cancellation processing on a port line of an access device according to an embodiment of the present invention by using a specific application scenario. In the embodiment of the present invention, a first access device and a second access device are interconnected through cables, and it is defined that an access device having a maximum number of ports which are currently in a working state serves as a main control access device. Referring to FIG. 5, the method includes:

501. An interface which connects the first access device and the second access device enters a working state.

When the interface which connects the first access device and the second access device enters a working state (that is, the interface is in an UP state), the first access device and the second access device can perform data transmission through the interface.

502. The first access device transmits the number of ports of the first access device which are currently in a working state (that is, in a showtime state) to the second access device through the interface.

503. The second access device transmits the number of ports of the second access device which are currently in a working state to the first access device through the interface.

504. The first access device compares the number of the local ports which are currently in a working state with the number of the ports of the second access device which are currently in a working state, to determine the first access device as a main control access device (assume that in the embodiment of the present invention, the number of the ports of the first access device which are currently in a working state is greater than the number of the ports of the second access device which are currently in a working state).

505. The second access device compares the number of the local ports which are currently in a working state with the number of the ports of the first access device which are currently in a working state, to determine the first access device as a main control access device (assume that in the embodiment of the present invention, the number of the ports of the first access device which are currently in a working state is greater than the number of the ports of the second access device which are currently in a working state).

506. The first access device sends local line configuration information of the first access device to the second access device.

507. The second access device sends local line configuration information of the second access device to the first access device.

508. The first access device coordinates, in a unified manner, crosstalk cancellation processing performed by the first access device and the second access device.

After step 507, the first access device serving as the main control access device coordinates, in a unified manner, crosstalk cancellation processing performed by the first access device and the second access device, so that the first access device completes crosstalk cancellation processing of a local port line, and the second access device completes crosstalk cancellation processing of a local port line.

It can be seen from the foregoing that, in the embodiment of the present invention, different port lines belonging to a same cable bundle are configured with a same line group identifier, and an access device obtains line configuration information of another access device connected to the access device, and implements, according to the line configuration information, cancellation of crosstalk among lines having the same line group identifier. In the solution of the present invention, different wire pairs in a same cable bundle may be connected to ports of different access devices, which can satisfy a scenario in which subscribers on a same cable bundle are connected to different access devices.

Figure 6:
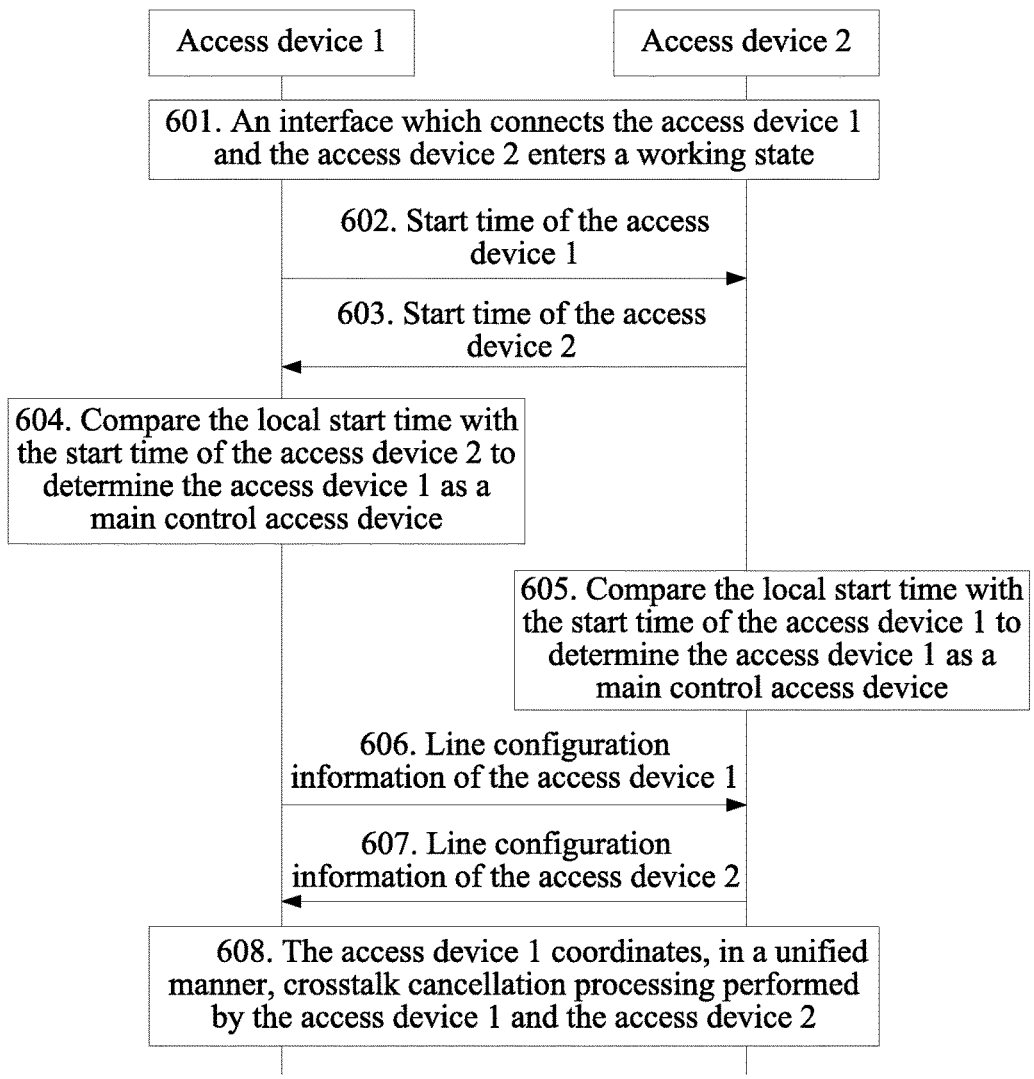
FIG. 6 is a schematic flow chart of still another application scenario of a method for crosstalk cancellation processing on a port line of an access device according to the present invention.

The following describes a method for crosstalk cancellation processing on a port line of an access device according to an embodiment of the present invention by using a specific application scenario. In the embodiment of the present invention, a first access device and a second access device are interconnected through cables, and it is defined that an access device having earliest start time serves as a main access device. Referring to FIG. 6, the method includes:

601. An interface which connects the first access device and the second access device enters a working state.

When the interface which connects the first access device and the second access device enters a working state (that is, the interface is in an UP state), the first access device and the second access device can perform data transmission through the interface.

602. The first access device transmits start time of the first access device to the second access device through the interface.

603. The second access device transmits start time of the second access device to the first access device through the interface.

604. The first access device compares the start time of the first access device with the start time of the second access device to determine the first access device as a main control access device (assume that in the embodiment of the present invention, the start time of the first access device is earlier than the start time of the second access device).

605. The second access device compares the start time of the second access device with the start time of the first access device to determine the first access device as a main control access device (assume that in the embodiment of the present invention, the start time of the first access device is earlier than the start time of the second access device).

606. The first access device sends local line configuration information of the first access device to the second access device.

607. The second access device sends local line configuration information of the second access device to the first access device.

608. The first access device coordinates, in a unified manner, crosstalk cancellation processing performed by the first access device and the second access device.

After step 607, the first access device serving as the main control access device coordinates, in a unified manner, crosstalk cancellation processing performed by the first access device and the second access device, so that the first access device completes crosstalk cancellation processing of a local port line, and the second access device completes crosstalk cancellation processing of a local port line.

It can be seen from the foregoing that, in the embodiment of the present invention, different port lines belonging to a same cable bundle are configured with a same line group identifier, and an access device obtains line configuration information of another access device connected to the access device, and implements, according to the line configuration information, cancellation of crosstalk among lines having the same line group identifier. In the solution of the present invention, different wire pairs in a same cable bundle may be connected to ports of different access devices, which can satisfy a scenario in which subscribers on a same cable bundle are connected to different access devices.

Figure 7:
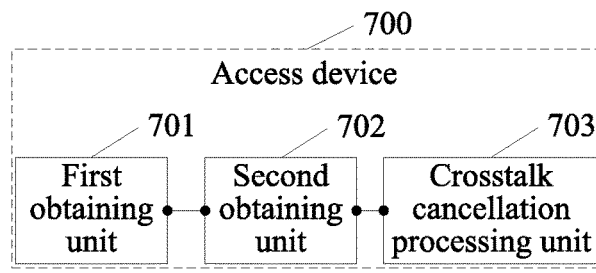
FIG. 7 is a schematic structural diagram of an access device according to an embodiment of the present invention.

The following describes an access device according to an embodiment of the present invention. Referring to FIG. 7, an access device 700 in the embodiment of the present invention includes: a first obtaining unit 701, configured to obtain line configuration information of another access device connected to the access device 700, where the line configuration information includes line operation parameters and a line group identifier of at least one port line, and line group identities of different port lines belonging to a same cable bundle are the same; a second obtaining unit 702, configured to respectively obtain, according to the line configuration information of the another access device obtained by the first obtaining unit 701, a coefficient of an effect from a port line of the another access device having a same line group identifier as that of a local port line on the local port line; and a crosstalk cancellation processing unit 703, configured to perform crosstalk cancellation processing on the local port line of the access device 700 on the basis of the effect coefficient obtained by the second obtaining unit 702.

Because multiple access devices are generally configured at a same network position, in practical application, multiple interconnected access devices exchange local line configuration information with each other. In the embodiment of the present invention, the access device 700 further includes a sending unit, configured to send line configuration information of the access device 700 to the another access device connected to the access device 700, so that the another access device performs crosstalk cancellation processing according to the line configuration information of the access device 700.

In an application scenario, a main control access device is determined from multiple access devices, and the main control access device coordinates a crosstalk cancellation processing procedure of all the interconnected access devices at the network position in a unified manner. In the embodiment of the present invention, a standard for determining the main control access device from the multiple interconnected access devices may be defined. The first obtaining unit 701 is further configured to, when an interface which connects the access device 700 and the another access device enters a working state, obtain device related information of the another access device through the interface. The access device 700 further includes a determining unit, configured to, according to local device related information of the access device 700 and the device related information of the another access device obtained by the first obtaining unit 701, determine an access device from the access device 700 and the another access device connected to the access device 700 as a main control access device according to a preset rule. Further, the sending unit of the access device 700 is further configured to, when the interface which connects the access device 700 and the another access device enters a working state, send the local device related information of the access device 700 to the another access device through the interface, so that the another access device determines the main control access device according to the device related information of the access device 700.

In the embodiment of the present invention, due to a limitation of a hardware resource, for a certain port line of the access device, effects from all other port lines in a same group may not be completely eliminated. Therefore, in the embodiment of the present invention, the access device 700 may further include: a sorting unit, configured to, when the number of effect coefficients obtained by the second obtaining unit 702 exceeds a maximum resource cancellation number supported by the local port line, sort the obtained effect coefficients in descending order according to effect degrees of the obtained effect coefficients on the local port line of the access device 700. The crosstalk cancellation processing unit 703 is further configured to perform crosstalk cancellation processing on the local port line of the access device 700 on the basis of a preset number of first effect coefficients after the sorting, where the preset number is smaller than or equal to the maximum resource cancellation number supported by the local port of the access device 700.

It should be noted that the access device 700 in the embodiment of the present invention may be the access device in the foregoing method embodiments, and may be configured to implement all the technical solutions in the foregoing method embodiments; and functions of the functional modules of the access device 700 may specifically be implemented according to the method in the foregoing method embodiments. For a specific implementation process, reference may be made to related description in the foregoing embodiments, which is not repeatedly described herein.

It can be seen from the foregoing that, in the embodiment of the present invention, different port lines belonging to a same cable bundle are configured with a same line group identifier, and an access device obtains line configuration information of another access device connected to the access device, and implements, according to the line configuration information, cancellation of crosstalk among lines having the same line group identifier. In the solution of the present invention, different wire pairs in a same cable bundle may be connected to ports of different access devices, which can satisfy a scenario in which subscribers on a same cable bundle are connected to different access devices.

The following describes a system for crosstalk cancellation according to an embodiment of the present invention. The system for crosstalk cancellation in the embodiment of the present invention includes at least two interconnected access devices.

An access device of the at least two interconnected access devices is configured to: obtain line configuration information of another access device connected to the access device, where the line configuration information includes line operation parameters and a line group identifier of at least one port line, and line group identities of different port lines belonging to a same cable bundle are the same; respectively obtain, according to the line configuration information of the another access device, a coefficient of an effect from a port line of the another access device having a same line group identifier as that of a local port line on the local port line; and perform crosstalk cancellation processing on the local port line on the basis of the obtained effect coefficient.

It should be noted that the access device in the embodiment of the present invention may be the access device 700 in the foregoing device embodiment, and may be configured to implement all the technical solutions in the foregoing device embodiment; and functions of the functional modules of the access device may specifically be implemented according to the method in the foregoing method embodiments. For a specific implementation process, reference may be made to related description in the foregoing embodiments, which is not repeatedly described herein.

It can be seen from the foregoing that, in the embodiment of the present invention, different port lines belonging to a same cable bundle are configured with a same line group identifier, and an access device obtains line configuration information of another access device connected to the access device, and implements, according to the line configuration information, cancellation of crosstalk among lines having the same line group identifier. In the solution of the present invention, different wire pairs in a same cable bundle may be connected to ports of different access devices, which can satisfy a scenario in which subscribers on a same cable bundle are connected to different access devices.

The method and the related device and system for crosstalk cancellation processing on a port line of an access device provided by the present invention are described in detail in the foregoing. A person of ordinary skill in the art may make variations to the present invention in terms of specific implementation manners or application scopes according to the idea of the embodiments of the present invention. Therefore, the content of the specification shall not be construed as a limitation to the present invention.

What is claimed is:

1. A method for crosstalk cancellation processing on a local port line interconnecting at least two access devices, the method comprising:
    obtaining, by a first access device of the at least two access devices, line configuration information of a second access device of the at least two access devices, wherein the line configuration information comprises line operation parameters and a line group identifier of at least one port line, and wherein line group identities of different port lines belonging to a same cable bundle are the same;
    obtaining, by the first access device, one or more effect coefficients according to the line configuration information of the second access device, the effect coefficients corresponding to one or more port lines of the second access device having a same line group identifier as the local port line; and
    performing crosstalk cancellation processing on the local port line in accordance with the effect coefficients.

2. The method according to claim 1, wherein before the performing crosstalk cancellation processing on the local port line on the basis of the effect coefficient, the method further comprises:
    sending line configuration information of the access device to the second access device, wherein sending the line configuration information to the second access device prompts the second access device to perform crosstalk cancellation processing according to the line configuration information.

3. The method according to claim 1, wherein before obtaining line configuration information of another access device connected to the first access device, the method comprises:
    obtaining device related information of the second access device through an interface connecting the first access device to the second access device when the interface enters a working state; and
    determining that either the first access device or the second access device is a main control access device using a preset rule in accordance with device related information of both the first access device and the second access device, wherein the main control access device coordinates a crosstalk cancellation processing procedure between the first access device and the second access device in a unified manner.

4. The method according to claim 3, wherein the device related information comprises a medium access control (MAC) address of the access device.

5. The method according to claim 3, wherein the device related information comprises a number of ports of the access device which are currently in a working state.

6. The method according to claim 3, wherein the device related information comprises a start time of the first access device.

7. The method according to claim 1, wherein after obtaining the effect coefficients, the method comprises:
    if the number of effect coefficients exceeds a maximum resource cancellation number supported by the local port line, sorting the effect coefficients in descending order according to effect degrees of the effect coefficients on the local port line to obtain a list of sorted effect coefficients, and wherein performing crosstalk cancellation processing on the local port line in accordance with the effect coefficients comprises performing crosstalk cancellation processing on the local port line in accordance with a preset number of leading effect coefficients in the list of sorted effect coefficients, wherein the preset number is smaller than or equal to the maximum resource cancellation number supported by the local port.

8. A first access device, comprising:

a processor; and a non-transitory computer-readable storage medium storing a program to be executed by the processor, the program including instructions for:

obtaining line configuration information of a second access device connected to the first access device, wherein the line configuration information comprises line operation parameters and a line group identifier of at least one port line, and wherein line group identities of different port lines belonging to a same cable bundle are the same;

obtaining one or more effect coefficients according to the line configuration information of the second access device, the effect coefficients corresponding to one or more port lines of the second access device having a same line group identifier as a local port line of the first access device; and performing crosstalk cancellation processing on the local port line in accordance with the effect coefficients.

9. The first access device according to claim 8, further comprising:

a transmitter, configured to send line configuration information of the first access device to the second access device, wherein sending the line configuration information to the second access device prompts the second access device to perform crosstalk cancellation processing according to the line configuration information.

10. The first access device according to claim 8, wherein the program further includes instructions for:

obtaining device related information of the second access device through an interface connecting the first access device and the second access device when the interface enters a working state, and determining that either the first access device or the second access device is a main access controller according to device related information of both the first access device and the second access device, wherein the main control access device coordinates a crosstalk cancellation processing procedure between the first access device and the second access device in a unified manner.

11. The first access device according to claim 8, wherein the program further includes instructions for:

sorting the effect coefficients in descending order according to effect degrees of the effect coefficients on the local port line to obtain a list of sorted effect coefficients when the number of effect coefficients exceeds a maximum resource cancellation number supported by the local port line, and performing crosstalk cancellation processing on the local port line in accordance with the effect coefficients by performing crosstalk cancellation processing on the local port line in accordance with a preset number of first effect coefficients in the list of sorted effect coefficients, wherein the preset number is smaller than or equal to the maximum resource cancellation number supported by the local port.

12. A system for crosstalk cancellation, comprising:

at least two interconnected access devices, wherein a first access device of the at least two interconnected access devices is configured to:

obtain line configuration information of a second access device connected to the first access device, wherein the line configuration information comprises line operation parameters and a line group identifier of at least one port line, and line group identities of different port lines belonging to a same cable bundle are the same;

obtain one or more effect coefficients according to the line configuration information of the second access device, the effect coefficients corresponding to port lines of the second access device having a same line group identifier as a local port line of the first access device; and perform crosstalk cancellation processing on the local port line in accordance with the effect coefficients.

13. The system according to claim 12, wherein the first access device is further configured to:

send line configuration information of the first access device to the second access device, wherein sending the line configuration information to the second access device prompts the second access device to perform crosstalk cancellation processing according to the line configuration information.

14. The system according to claim 12, wherein the first access device is further configured to:

obtain device related information of the second access device through an interface connecting the first access device to the second access device when the interface enters a working state; and determine that either the first access device or the second access device is a main control access device using a preset rule in accordance with device related information of both the first access device and the second access device, wherein the main control access device coordinates a crosstalk cancellation processing procedure between the first access device and the second access device in a unified manner.

15. The system according to claim 14, wherein the device related information comprises a medium access control (MAC) address of the first access device.

16. The system according to claim 14, wherein the device related information comprises a number of ports of the first access device which are currently in a working state.

17. The system according to claim 14, wherein the device related information comprises a start time of the first access device.

18. The system according to claim 12, wherein the first access device is further configured to:

if the number of effect coefficients exceeds a maximum resource cancellation number supported by the local port line, sort the effect coefficients in descending order according to effect degrees of the effect coefficients on the local port line to obtain a list of sorted effect coefficients, wherein performing crosstalk cancellation processing on the local port line in accordance with the effect coefficients comprises performing crosstalk cancellation processing on the local port line in accordance with a preset number of leading effect coefficients in the list of sorted effect coefficients, wherein the preset number is smaller than or equal to the maximum resource cancellation number supported by the local port.

* * * * *